US008484825B2

(12) United States Patent
Agata et al.

(10) Patent No.: US 8,484,825 B2
(45) Date of Patent: Jul. 16, 2013

(54) METHOD OF PRODUCING AN ALUMINUM BASE PART

(75) Inventors: Masaki Agata, Wako (JP); Hiroyuki Yoshida, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/467,556

(22) Filed: May 9, 2012

(65) Prior Publication Data

US 2012/0216979 A1  Aug. 30, 2012

Related U.S. Application Data

(63) Continuation of application No. 12/332,686, filed on Dec. 11, 2008, now abandoned.

(30) Foreign Application Priority Data

Dec. 19, 2007  (JP) .................................. 2007-327434

(51) Int. Cl.
*B22D 27/11* (2006.01)
(52) U.S. Cl.
USPC ....... 29/527.1; 29/527.2; 29/527.3; 29/527.5; 164/120; 72/353.2
(58) Field of Classification Search
USPC ............ 29/527.1, 527.2, 527.3, 527.4, 527.5; 72/353.2, 47, 259, 355.2, 355.3, 355.4, 355.5, 72/355.6; 428/650; 164/113, 120, 76.1
See application file for complete search history.

(56) References Cited

U.S. PATENT DOCUMENTS

| 3,750,450 A | * | 8/1973 | Sharp et al. ............... 72/353.2 |
| 5,491,030 A | | 2/1996 | Asai et al. |
| 2002/0146597 A1 | | 10/2002 | Chen |
| 2005/0120557 A1 | | 6/2005 | Gatton et al. |
| 2005/0279429 A1 | | 12/2005 | Kotani et al. |

FOREIGN PATENT DOCUMENTS

| JP | 59-179795 A | | 10/1984 |
| JP | 05-138326 A | | 6/1993 |
| JP | 7-316877 A | | 12/1995 |
| JP | 2003-305556 A | | 10/2003 |
| JP | 2004-017738 A | | 1/2004 |
| JP | 2004017738 A | * | 1/2004 |
| JP | 2005-74461 A | | 3/2005 |
| JP | 2005-74462 A | | 3/2005 |
| JP | 2006-143205 A | | 6/2006 |

* cited by examiner

*Primary Examiner* — Jermie Cozart
(74) *Attorney, Agent, or Firm* — Westerman, Hattori, Daniels & Adrian, LLP

(57) ABSTRACT

An aluminum base part is composed of a forging cast product produced by a forging cast process and a nickel chromium plating layer formed on the forging cast product. The nickel chromium plating layer is composed of a semibright nickel plating layer formed on the forging cast product and having a thickness of 5 to 10 μm, a bright nickel plating layer 33 formed on the semibright nickel plating layer 31 and having a thickness of 5 to 10 μm, and a chromium plating layer 37 formed on the bright nickel plating layer 33 and having a thickness of 0.5 to 3 μm. The present invention adopts a forging cast product rather than a cast product. The forging cast product has a smooth surface, so that a plating layer can be directly formed on the surface of the forging cast product without forming an undercoat resin layer.

9 Claims, 5 Drawing Sheets

(a)

(b)

(c)

(d)

(e)

(f)

METHOD OF PRODUCING AN ALUMINUM BASE PART

CROSS-REFERENCE TO RELATED APPLICATIONS

This application is a continuation application of U.S. application Ser. No. 12/332,686, filed Dec. 11, 2008, now abandoned and which is based on and claims priority from Japanese Patent Application No. 2007-327434, filed Dec. 19, 2007, the entirety of which is incorporated herein by reference.

TECHNICAL FIELD

The present invention relates to a manufacturing technique for an aluminum base part.

BACKGROUND OF THE INVENTION

An aluminum base part is sometimes used for a handle holder in a motorcycle or a door knob and emblem in a passenger car. In this case, the aluminum base part becomes an exterior part exposed to a person's sight, and a good appearance of the aluminum base part is therefore desired.

Various techniques for improving the appearance of an aluminum base part have been proposed (see PCT Patent Publication No. WO 00143153 pamphlet (page 22) and Japanese Patent Laid-Open No. 2004-17738, for example).

SUMMARY OF THE INVENTION

The invention disclosed in PCT Patent Publication No. WO 00143153 discloses a surface treating method for a light metal casting including a casting step for applying a casting pressure of greater than about 50 megapascals from an injection plunger to a molten metal of light metal material supplied into a die to thereby form a casting so that pin holes generated on its casting surface are suppressed to meet predetermined conditions; a polishing step for polishing the casting surface so that the surface roughness of a polished surface becomes a predetermined value or less; a coating step for forming a first resin coating layer on the polished surface; and a plating step for forming a metal or metal compound layer on the surface of the first resin coating layer by dry plating.

According to this method, the size and number of pin holes are sufficiently reduced by squeeze casting. Further, barrel polishing is next performed to reduce the surface roughness. Thereafter, resin is coated, and plating is next performed. As a result, a light metal cast product having a bright design surface can be provided.

However, the coating step for coating the resin is indispensable, thus the number of man-hours increases, causing an increase in production cost.

Japanese Patent Laid-Open No. 2004-17738 discloses a surface brightened light alloy wheel for an automobile including a light alloy wheel body having a minutely rough surface, a resin coating formed on the surface of the light alloy wheel body, a titanium alloy thin film formed on the resin coating and having a chromium plating appearance, and a transparent resin protective layer formed on the titanium alloy thin film. Thus, the resin coating is formed on the surface of the light alloy wheel body. Also in this technique, a coating step for forming the resin coating is indispensable, thus the number of man-hours increases, causing an increase in production cost.

Accordingly, if the resin coating step can be eliminated, the number of man-hours can be reduced, thus reducing a production cost.

It is accordingly an object of the present invention to provide a technique which can improve the appearance of an aluminum base part without applying a resin as an undercoat.

There is provided an aluminum base part adapted to be provided on the exterior surface of a vehicle, including a forging cast product produced by a forging cast process and a nickel chromium plating layer formed on the forging cast product.

Further, the nickel chromium plating layer includes a semibright nickel plating layer formed on the forging cast product and having a thickness of 5 to 10 μm, a bright nickel plating layer formed on the semibright nickel plating layer and having a thickness of 5 to 10 μm, and a chromium plating layer formed on the bright nickel plating layer and having a thickness of 0.5 to 3 μm.

There is provided a manufacturing method for an aluminum base part adapted to be provided on the exterior surface of a vehicle, including preparing a pressing device including a die having upper and lower openings, a lower punch for closing the lower opening of the die, an upper punch opposed to the lower punch and adapted to be inserted into the die from its upper opening, a first cylinder unit for raising and lowering the upper punch, a partial punch formed as a divisional part of the upper punch, and a second cylinder unit for raising and lowering the partial punch; supplying an aluminum alloy molten metal into the die to which the lower punch is fitted; a primary pressing step performed by collectively inserting the upper punch and the partial punch into the die from the upper opening of the die to compress the molten metal; a secondary pressing step performed by increasing a pressing pressure of the upper punch but not the partial punch, generated by the first cylinder unit to further insert the upper punch into the die, thereby further compressing the molten metal; releasing a forging cast product from the die after solidification of the molten metal; and a plating the forging cast product with a nickel plating layer and a chromium plating layer.

The manufacturing method further includes polishing the surface of the forging cast product between the forming step and the plating step so that the average surface roughness of the forging cast product becomes 6 μm or less.

According to the invention, a forging cast product rather than a cast product is adopted. The forging cast product has a smooth surface, so that a plating layer can be directly formed on the surface of the forging cast product without forming an undercoat resin layer. Accordingly, the appearance of the aluminum base part can be improved without applying a resin as an undercoat, and the number of man-hours can therefore be reduced.

According to the invention, a semibright nickel plating layer having a thickness of 5 to 10 μm is first formed on the forging cast product, a bright nickel plating layer having a thickness of 5 to 10 μm is next formed on the semibright nickel plating layer, and a chromium plating layer having a thickness of 0.5 to 3 μm is finally formed on the bright nickel plating layer.

Thus, the semibright nickel plating layer having a thickness of 5 μm or more and the bright nickel plating layer having a thickness of 5 μm or more are formed as an undercoat layer, so that a sufficient corrosion resistance can be maintained. Furthermore, the maximum thickness of each nickel plating layer is set to 10 μm, so that the consumption of nickel can be suppressed.

The two nickel plating layers having a total thickness of 10 μm at a minimum are formed as an undercoat on the forging cast product. Accordingly, the thickness of the chromium plating layer as a top coat can be sufficiently reduced, and although it is reduced to 0.5 μm, a metallic luster can be produced to thereby maintain a good appearance. Further, a maximum thickness of the chromium plating layer is 3 μm, and thus the consumption of chromium can be suppressed.

According to the invention, the forging cast product is produced by a two-stage process composed of the primary pressing step and the secondary pressing step. By strongly compressing the molten metal, the density of the forging cast product can be increased. In the secondary pressing step, only the partial punch, which is independent of the upper punch, is allowed to be raised so that an excess amount of molten metal can escape toward the partial punch. Accordingly, even when the amount of molten metal supplied into the die is varied, this variation in supply amount can be absorbed by the amount of the rise of the partial punch. Accordingly, the finished shape of the forging cast product can be improved.

According to the invention, the forging cast product obtained by the forming step is polished so that the average surface roughness of the forging cast product is 6 μm or less. By setting the average surface roughness to be 6 μm or less, the appearance of the aluminum base part can be further improved.

BRIEF DESCRIPTION OF THE DRAWINGS

The advantages of the invention will become apparent in the following description taken in conjunction with the drawings, wherein.

DETAILED DESCRIPTION OF THE INVENTION

A preferred embodiment of the present invention will now be described with reference to the attached drawings.

Figure 1:
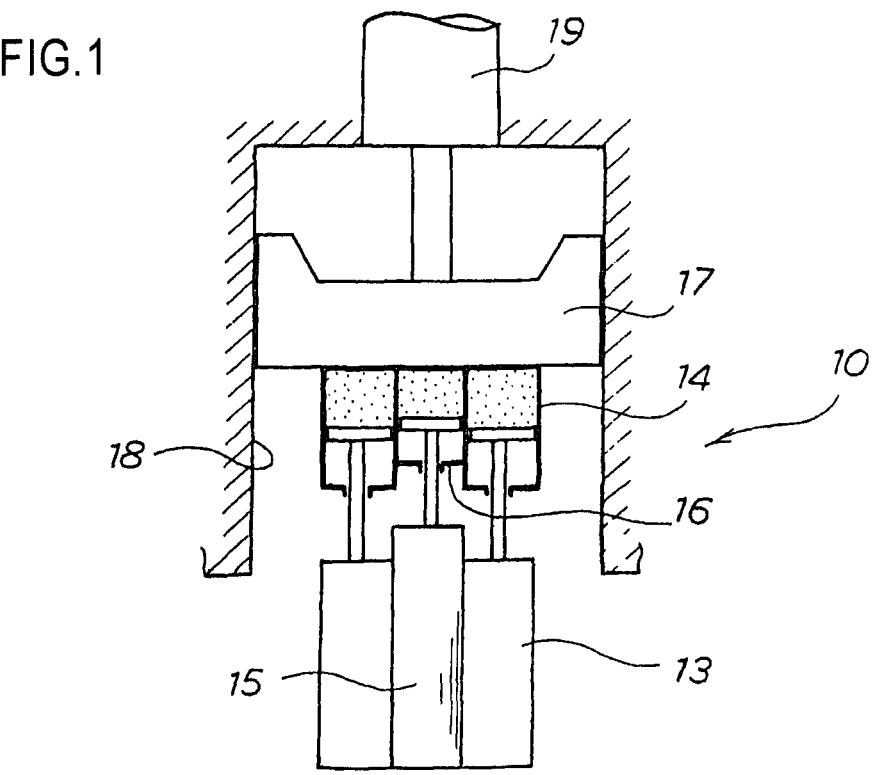
FIG. 1 is a schematic view showing the principle of a pressing device usable in the present invention.
Figure 1:
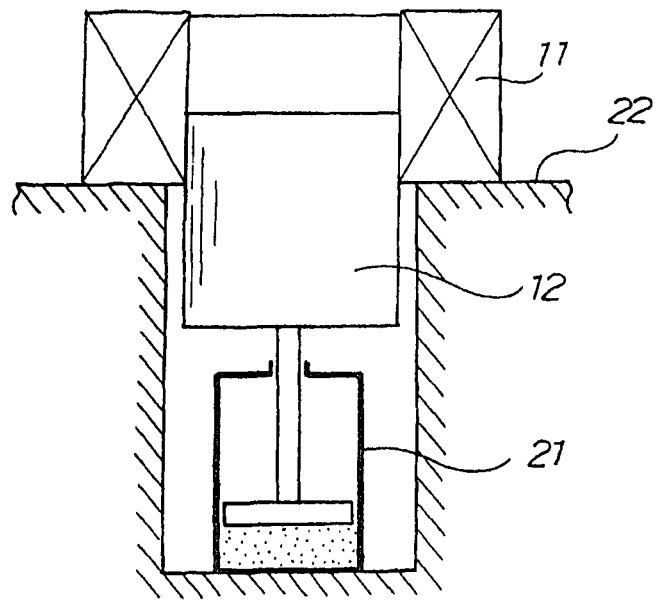

FIG. 1 is a schematic view showing the principle of a pressing device 10 used in this preferred embodiment. The pressing device 10 is composed of a cylindrical die 11 having upper and lower openings, a lower punch 12 for closing the lower opening of the die 11, an upper punch 13 opposed to the lower punch 12, a first cylinder unit 14 for raising and lowering the upper punch 13, a partial punch 15 formed as a divisional part of the upper punch 13, a second cylinder unit 16 for raising and lowering the partial punch 15, a support 17 for commonly supporting the first cylinder unit 14 and the second cylinder unit 16, a guide 18 for guiding the support 17 so as to prevent its oscillation, a third cylinder unit 19 for raising and lowering the support 17, a fourth cylinder unit 21 for raising and lowering the lower punch 12, and a base 22 for supporting the die 11.

The upper punch 13 has a hollow cylindrical shape, and the first cylinder unit 14 for raising and lowering the upper punch 13 also has a hollow cylindrical shape. The partial punch 15 is vertically movably inserted in the central hollow portion of the upper punch 13, and the second cylinder unit 16 for raising and lowering the partial punch 15 is inserted in the central hollow portion of the first cylinder unit 14.

There will now be described a forging cast process performed by using the pressing device 10 mentioned above.

Figure 2:
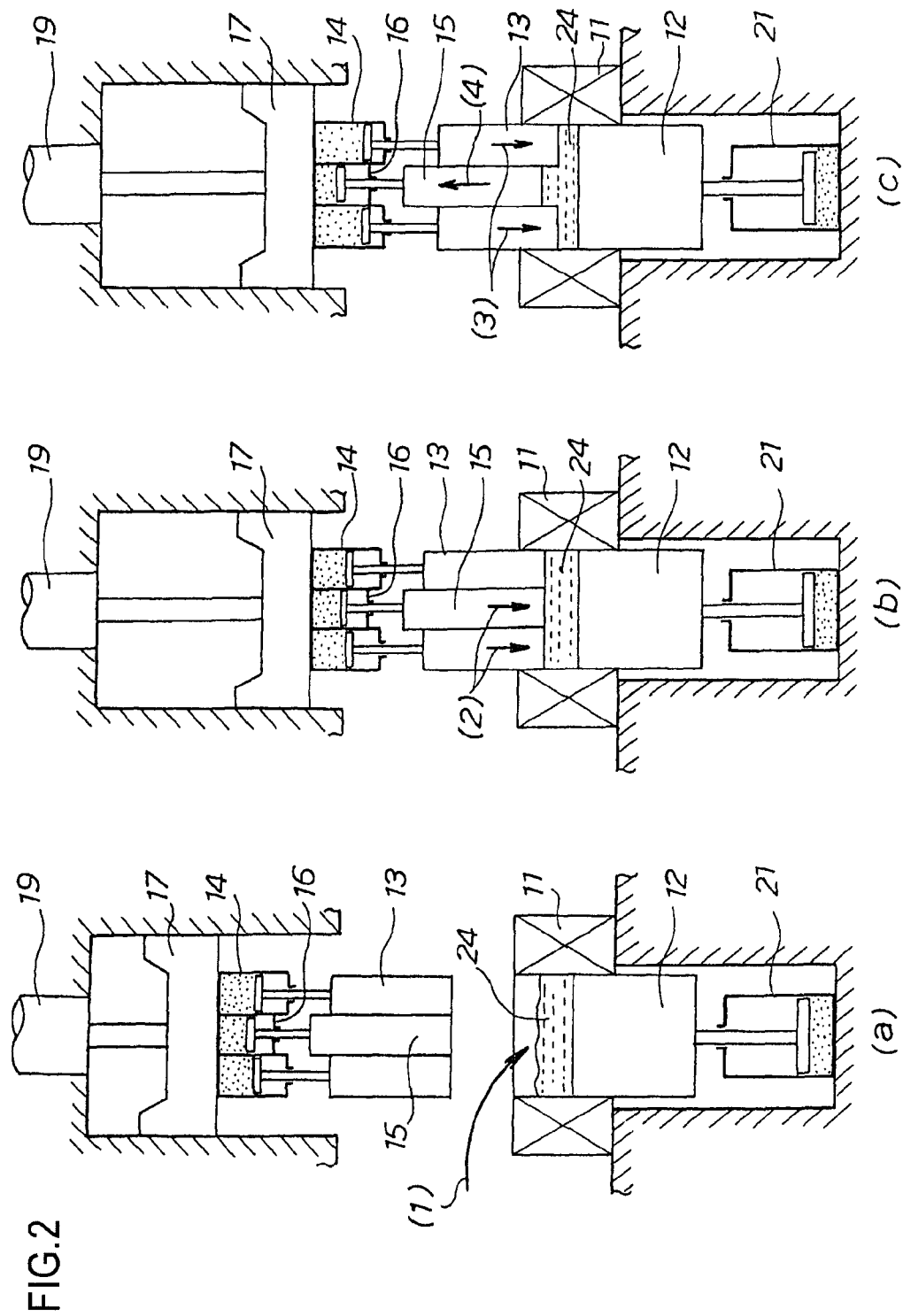
FIGS. 2(a) to 2(c) are schematic views for illustrating a forging cast process adopted in the present invention.

FIGS. 2(a), 2(b), and 2(c) are schematic views for illustrating the forging cast process according to the present invention. As shown in FIG. 2(a), a predetermined amount of molten metal 24 of aluminum alloy is supplied into the die 11 to which the lower punch 12 is fitted (as shown by an arrow (1)). Examples of the aluminum alloy include JIS A6000 family, JIS ADC12, JIS AC4CH, and equivalent. However, the kind of the aluminum alloy as the molten metal 24 is not especially limited.

The third cylinder unit 19 is next operated to collectively lower the support 17, the first cylinder unit 14, the second cylinder unit 16, the upper punch 13, and the partial punch 15.

As shown by arrows (2) in FIG. 2(b), the upper punch 13 and the partial punch 15 are inserted into the die 11 from the upper opening of the die 11 to compress the molten metal 24. At this time, the pressing pressure of the upper punch 13 (the pressure applied to unit area of the surface of the molten metal 24, the same applying to the following description) is set equal to the pressing pressure of the partial punch 15. Since the pressing pressure of the upper punch 13 is equal to that of the partial punch 15, the upper punch 13 and the partial punch 15 are lowered together. This lowering operation will be hereinafter referred to as a primary pressing step.

By compressing (pressurizing) the molten metal 24 in the primary pressing step, a minute amount of gases (especially, $H_2$ gas) contained in the molten metal 24 can be expelled. That is, degassing of the molten metal 24 can be attained.

The hydraulic pressure of the first cylinder unit 14 is next increased while the hydraulic pressure of the second cylinder unit 16 is kept unchanged. Accordingly, as shown in FIG. 2(c), the upper punch 13 is lowered as shown by arrows (3). As a result, the molten metal 24 is strongly compressed to escape and push up the partial punch 15.

That is, the partial punch 15 is raised as shown by an arrow (4). When the pressing pressure of the upper punch 13 and the pressing pressure of the partial punch 15 are balanced, the movement of the upper punch 13 and the partial punch 15 is stopped. In this condition, solidification of the molten metal 24 is performed. This operation shown in FIG. 2(c) will be hereinafter referred to as a secondary pressing step.

The partial punch 15 serves as a buffer. Accordingly, even when the amount of the molten metal 24 supplied in the step of FIG. 2(a) is varied, the molten metal 24 can be pressurized without any trouble in the step of FIG. 2(c).

After the molten metal 24 is solidified in the step of FIG. 2(c), the upper punch 13 and the partial punch 15 are raised. Thereafter, the fourth cylinder unit 21 is operated to raise the lower punch 12. Accordingly, the forging cast product can be released from the die 11.

As described above, the molten metal 24 is pressurized by the upper punch 13 and the partial punch 15 in the step of FIG. 2(b). That is, the first stage of the forging cast process is performed as shown in FIG. 2(b). In addition, the molten metal 24 is forged by the lowering upper punch 13 and the rising partial punch 15, so that the molten metal 24 is pressurized more strongly. Thus, the second stage of the forging cast process is performed as shown in FIG. 2(c). By strongly pressurizing the molten metal 24, the density of the molten metal 24 can be increased and the generation of pin holes on the surface (casting surface) of the molten metal 24 solidified can be greatly reduced.

That is, by the two-stage forging cast process composed of the primary pressing step and the secondary pressing step, degassing of the molten metal 24 can be sufficiently performed to thereby obtain the forging cast product having a smooth casting surface.

The subsequent steps to be applied to the forging cast product obtained above will now be described with reference to FIGS. 3(a) to 3(f).

Figure 3:
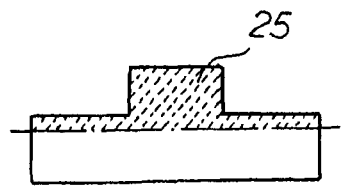
FIGS. 3(a) to 3(f) are schematic views for illustrating a forming step to a plating step in the present invention.
Figure 3:
Figure 3:
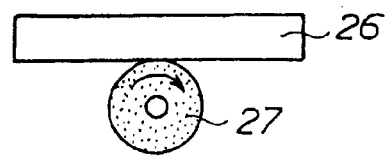
Figure 3:
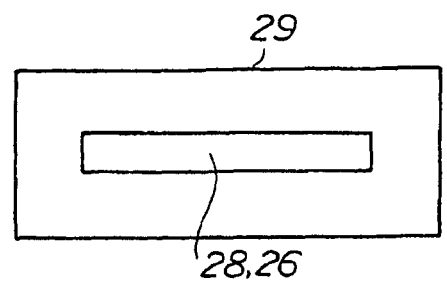
Figure 3:
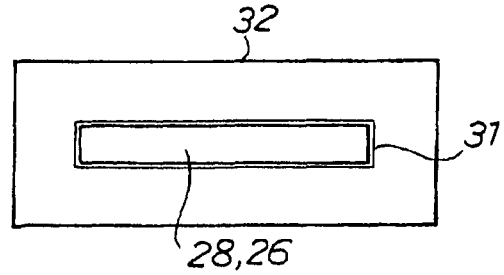
Figure 3:
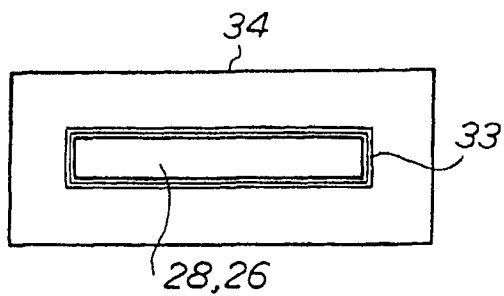

FIGS. 3(a) to 3(f) are schematic views for illustrating a forming step to a plating step in the present invention. As shown in FIG. 3(a), an undesired portion 25 is removed to obtain a formed forging cast product 26 as shown in FIG. 3(b). This forging cast product 26 may be directly subjected to plating. However, as shown in FIG. 3(c), the forging cast product 26 is preferably polished by using a buff 27 or a polishing belt prior to plating. By this polishing step, the average roughness Ra (arithmetic mean roughness defined by RS B0601) of the surface of the forging cast product 26 is set to 6 μm or less. In other words, the forging cast product 26 is polished so that the maximum value of the average roughness Ra is 6 μm.

As shown in FIG. 3(d), a polished forging cast product 28 obtained by the step of FIG. 3(c) (or the formed forging cast product 26) is next set in a semibright nickel electroplating device 29 to form an undercoat layer. The thickness of the undercoat layer may be determined by increasing or decreasing the period of time for conducting.

As shown in FIG. 3(e), the forging cast product 26 or 28 coated with a semibright nickel plating layer 31 as the undercoat layer is next set in a bright nickel electroplating device 32 to form an intermediate coat layer. The thickness of the intermediate coat layer may be determined by increasing or decreasing the period of time for conducting.

As shown in FIG. 3(f), the forging cast product 26 or 28 coated with a bright nickel plating layer 33 as the intermediate coat layer is next set in a chromium electroplating device 34 to form a top coat layer. The thickness of the top coat layer may be determined by increasing or decreasing a conducting period of time.

Figure 4:
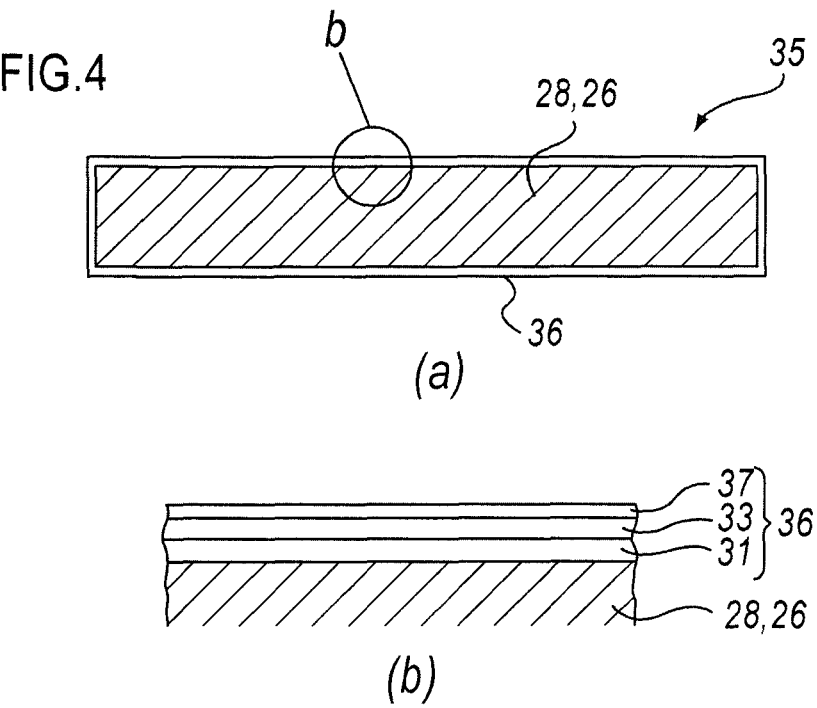
FIG. 4(a) is a sectional view of an aluminum base part according to the present invention.
FIG. 4(b) is an enlarged view of an encircled portion b in FIG. 4(a)

FIG. 4(a) is a sectional view of an aluminum base part 35 according to the present invention. For example, the aluminum base part 35 is a handle holder for fixing a steering handle of a motorcycle. As shown in FIG. 4(a), the aluminum base part 35 is composed of the forging cast product 28 or 26 produced by the forging cast process mentioned above and a nickel chromium plating layer 36 formed on the forging cast product 28 or 26.

FIG. 4(b) is an enlarged view of an encircled portion b in FIG. 4(a). As shown in FIG. 4(b), the nickel chromium plating layer 36 is composed of the semibright nickel plating layer 31 formed on the surface of the forging cast product 28 or 26 and having a thickness of 5 to 10 μm, the bright nickel plating layer 33 formed on the semibright nickel plating layer 31 and having a thickness of 5 to 10 μm, and a chromium plating layer 37 formed on the bright nickel plating layer 33 and having a thickness of 0.5 to 3 μm.

Thus, the nickel plating layers 31 and 33 are formed under the chromium plating layer 37 in the nickel chromium plating layer 36. The chromium plating layer 37 as the top coat layer functions to improve the appearance, and the nickel plating layers 31 and 33 as the undercoat and intermediate coat layers function to maintain a sufficient corrosion resistance. The thickness of the chromium plating layer 37, which is not required to have corrosion resistance, may be small, but the thicknesses of the nickel plating layers 31 and 33, which are required to have corrosion resistance, must be determined carefully.

The thicknesses of the nickel plating layers 31 and 33 will now be discussed.

Figure 5:
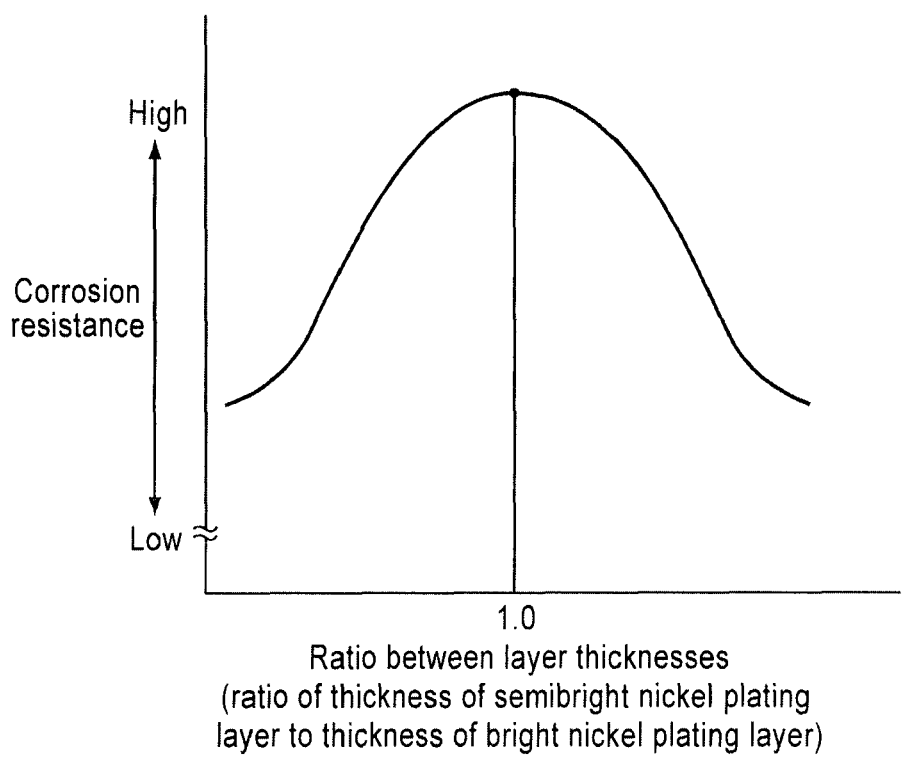
FIG. 5 is a graph showing the correlation between the ratio between the layer thicknesses and the corrosion resistance.

FIG. 5 is a graph showing the correlation between the ratio between the layer thicknesses and the corrosion resistance. The ratio between the layer thicknesses is defined as the ratio of the thickness of the semibright nickel plating layer 31 to the thickness of the bright nickel plating layer 33. The corrosion resistance was examined with this ratio being changed. As the result of this examination, it was found that when the ratio is 1.0, the corrosion resistance is highest. Accordingly, the thickness of the semibright nickel plating layer 31 was equal to or almost equal to the thickness of the bright nickel plating layer 33.

Figure 6:
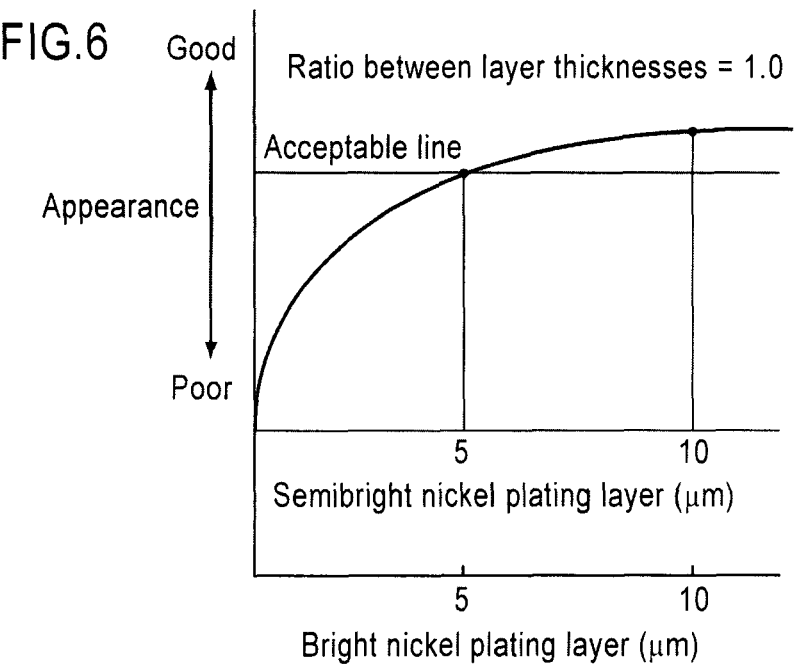
FIG. 6 is a graph showing the correlation between the layer thicknesses and the appearance.

FIG. 6 is a graph showing the correlation between the layer thicknesses and the appearance. The ratio between the layer thicknesses was fixed at 1.0, and the thickness of the semibright nickel plating layer 31 and the thickness of the bright nickel plating layer 33 were changed to examine the appearance. As the result of this examination, it was found that the larger the thicknesses of these layers 31 and 33, the better the appearance.

Further, it was determined that when the thickness of the semibright nickel plating layer 31 is 5 μm or more and the thickness of the bright nickel plating layer 33 is 5 μm or more, the appearance can exceed an acceptable line.

However, when the thickness of the semibright nickel plating layer 31 exceeds 10 μm and the thickness of the bright nickel plating layer 33 exceeds 10 μm, the curve showing this correlation becomes flat, so that the appearance was not remarkably improved.

Accordingly, it is preferable that the thickness of the semibright nickel plating layer 31 is 5 to 10 μm and the thickness of the bright nickel plating layer 33 is also 5 to 10 μm.

The polishing performed in the step of FIG. 3(c) will now be examined.

Figure 7:
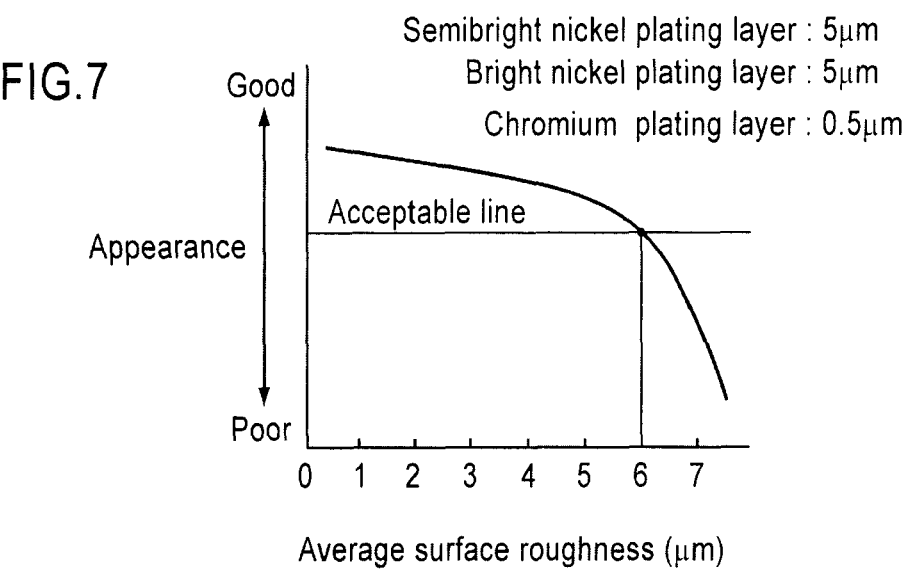
FIG. 7 is a graph showing the correlation between the surface roughness of a forging cast product and the appearance.

FIG. 7 is a graph showing the correlation between the surface roughness of the forging cast product and the appearance. A forging cast product having an average surface roughness Ra of 1 to 7 μm was prepared and the nickel chromium plating layer 36 was formed on this forging cast product, wherein the thickness of the semibright nickel plating layer 31 to 5 μm, the thickness of the bright nickel plating layer 33 was 5 μm, and the chromium plating layer 37 was 0.5 μm. By using these samples having different values for the average surface roughness Ra, the appearance was evaluated. As the result of this evaluation, it was found that the smaller the average surface roughness Ra, the better the appearance. Further, it was determined that when the average surface roughness Ra is 6.0 μm or less, the appearance can exceed an acceptable line.

Accordingly, when the average surface roughness Ra of the forging cast product (reference numeral 26 shown in FIG. 3(b)) is 6.0 μm or less, polishing is not performed, but the plating is directly applied to the forging cast product 26. However, when the average surface roughness Ra of the forging cast product 26 is greater than 6.0 μm, polishing is preferably performed to reduce the average surface roughness Ra to 6.0 μm or less.

While the nickel chromium plating layer 36 is composed of the two nickel plating layers 31 and 33 and the single chromium plating layer 37 in this preferred embodiment, one nickel plating layer or three or more nickel plating layers may be used in place of the two nickel plating layers 31 and 33. Thus, the number of nickel plating layers is arbitrary.

Further, while the forging cast process preferably includes a two-stage pressing process composed of the primary pressing step and the secondary pressing step in this preferred embodiment, the forging cast process according to the present invention may include a single-stage pressing process composed of only the primary pressing step or only the secondary pressing step. Further, the forging cast process may include a three or more-stage pressing process.

The present invention is applicable to an aluminum base part as an exterior part of a vehicle.

Although a specific form of embodiment of the instant invention has been described above and illustrated in the accompanying drawings in order to be more clearly understood, the above description is made by way of example and not as a limitation to the scope of the instant invention. It is contemplated that various modifications apparent to one of ordinary skill in the art could be made without departing from the scope of the invention which is to be determined by the following claims.

We claim:

1. A method of producing an aluminum base part, comprising:
    preparing a pressing device including:
        a die having upper and lower openings,
        a lower punch for closing the lower opening of said die,
        an upper punch opposed to said lower punch and adapted to be inserted into said die from the upper opening of said die, said upper punch including a partial punch formed as a divisional part of said upper punch,
        a first cylinder unit for raising and lowering said upper punch, and
        a second cylinder unit for raising and lowering said partial punch;
    supplying an aluminum alloy molten metal into said die to which said lower punch is fitted;
    a primary pressing step of collectively pressing said upper punch and said partial punch with pressing pressure generated by said first cylinder unit and said second cylinder unit, said upper punch and said partial punch being inserted into said die from an upper opening thereof, to compress said molten metal;
    a secondary pressing step of increasing the pressing pressure of said upper punch generated by said first cylinder unit, but not increasing the pressing pressure of said partial punch generated by the second cylinder unit, to further insert said upper punch into said die, thereby further compressing said molten metal, thereby forming a forging cast product;
    releasing said forging cast product from said die after solidification of said molten metal;
    nickel plating said forging cast product with a nickel plating layer to form a nickel plated forging cast product; and
    chromium plating said nickel plated forging cast product with a chromium plating layer.

2. The method according to claim 1, wherein said nickel chromium plating layer comprises:
    a semibright nickel plating layer formed on said forging cast product and having a thickness of 5 to 10 µm,
    a bright nickel plating layer formed on said semibright nickel plating layer and having a thickness of 5 to 10 µm, and
    a chromium plating layer formed on said bright nickel plating layer and having a thickness of 0.5 to 3 µm.

3. The method according to claim 2, wherein said forging cast product has a surface roughness Ra of 6.0 µm or less.

4. The method according to claim 2, wherein the thickness of said semibright nickel plating layer is approximately equal to the thickness of said bright nickel plating layer.

5. The method according to claim 4, wherein said forging cast product has a surface roughness Ra of 6.0 µm or less.

6. The method according to claim 1, wherein said forging cast product has a surface roughness Ra of 6.0 µm or less.

7. The method according to claim 1, wherein said aluminum base part is further produced by
    polishing a surface of said forging cast product between said releasing step and said plating step until an average surface roughness of said forging cast product is 6 µm or less.

8. The method according to claim 7,
    wherein said nickel plating step includes
        plating said forging cast product with a semibright nickel electroplating layer to form a semibright nickel electroplated forging cast product, and then
        plating said semibright nickel electroplated forging cast product with a bright nickel electroplating layer.

9. The method according to claim 1,
    wherein said nickel plating step includes
        plating said forging cast product with a semibright nickel electroplating layer to form a semibright nickel electroplated forging cast product, and then
        plating said semibright nickel electroplated forging cast product with a bright nickel electroplating layer.

* * * * *